2,972,119 REFERENCE SEARCH ROOM
T 5272E
X3345
RANDOM SWEEP GENERATOR
Filed Jan. 12, 1954
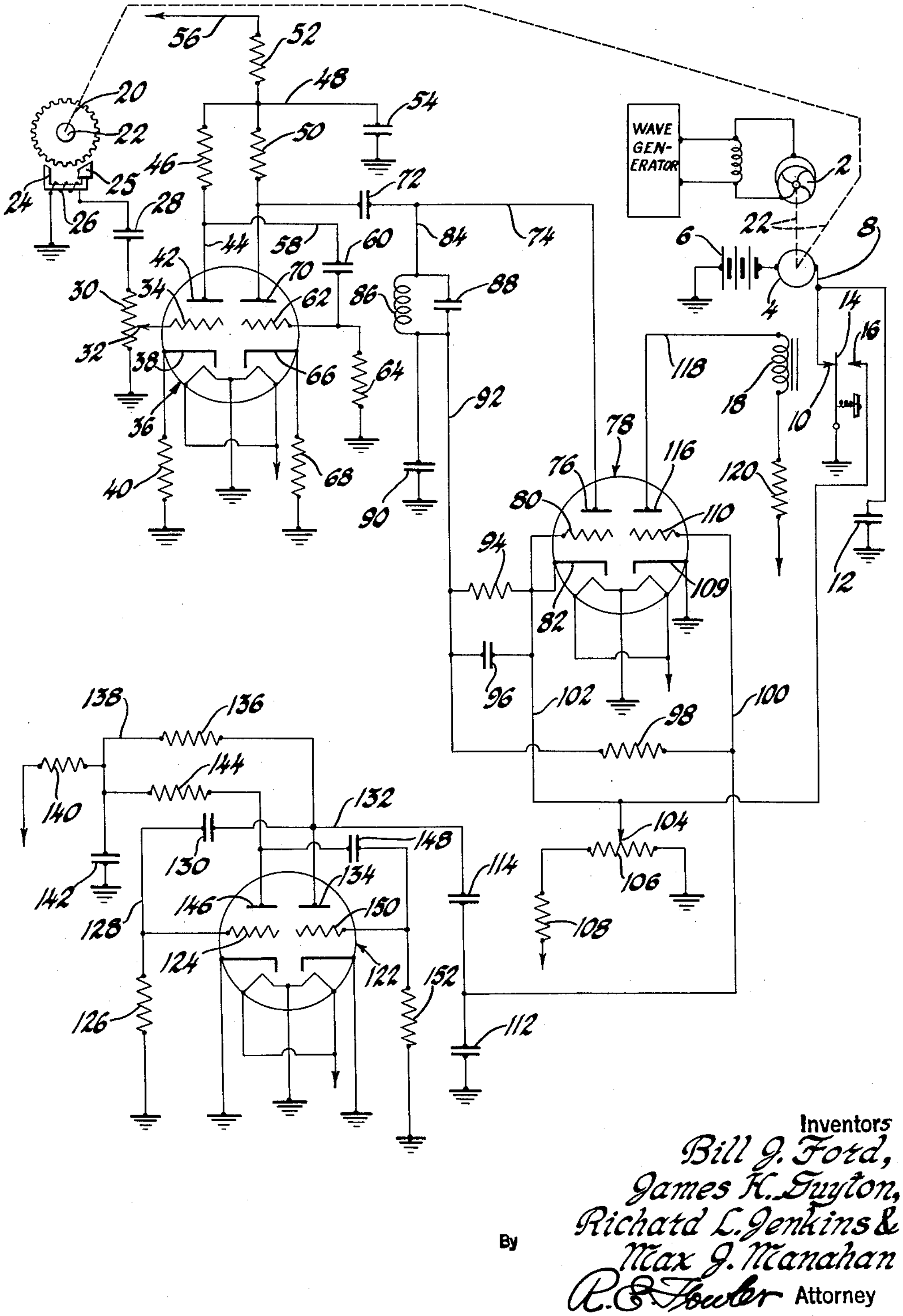
Inventors
Bill J. Ford,
James K. Guyton,
Richard L. Jenkins &
Max J. Manahan
By R. E. Fowler Attorney
2972119
OR IN 331/177R United States Patent Office 2,972,119

Patented Feb. 14, 1961

2,972,119

RANDOM SWEEP GENERATOR

Bill J. Ford, James H. Guyton, Richard L. Jenkins, and Max J. Manahan, Kokomo, Ind., assignors to General Motors Corporation, Detroit, Mich., a corporation of Delaware Filed Jan. 12, 1954, Ser. No. 403,600

10 Claims. (Cl. 331—177)

This invention relates to wave generating means and more particularly to wave generating means which continually varies its frequency between limits in an irregular manner.

In order to interfere with radio communication or radar equipment and prevent the transmittal of intelligence in warfare, "jamming" means are used. If an independent wave is transmitted of the same frequency as that being used by the communicating, transmitting, and receiving means in an area, the first wave will interfere with the communication and the signal will be unintelligible. Since the exact frequency of operation of enemy apparatus is usually not known, and since each group of communicating stations changes operating frequencies at frequent intervals to maintain secrecy, jamming means cannot be operated on a single frequency. Instead they scan a predetermined band within which it is believed enemy sets are operating. Jamming means cannot follow a regular pattern in scanning the band or the enemy may be able to discover the pattern change and in turn interfere with or jam the jamming means being operated so that it is ineffective.

It is therefore an object in making our invention to provide tuning means for an oscillator which continuously varies in a random manner over a prescribed frequency band.

It is a further object in making our invention to provide a random sweep rate generator for the oscillator of a transmitter for jamming purposes.

With these and other objects in view which will become apparent as the specification proceeds, our invention will be best understood by reference to the following specification and claims and the illustrations in the accompanying drawings, in which:

The figure is a circuit diagram of a random rate tuning control for an oscillator of a jamming transmitter.

A tuned resonnt electrical circuit consists of a capacity and inductance, the resonant frequency of which may be changed by varying either of the components. One conventional manner of tuning a resonant circuit is to provide a rotatable, variable condenser. The rotor 2 of such a tuning condenser of an oscillator is shown driven continuously by a small motor 4. This rotor may have any desired number of plates dependent upon how many sweeps through the band are required per revolution. As an example four are shown. This will cause the frequency of the oscillator to be cyclically varied between prescribed limits. A source of power such as a battery 6 is connected to one terminal of the motor and a conductive line 8 to the opposite terminal. Line 8 extends to stationary contact 10 of a switching means. A condenser 12 is connected between line 8 and ground. A grounded pivoted armature 14 moves between stationary contact 10 and a second spaced stationary contact 16. It is spring biased to the right, as shown in the drawing, and moved to the left by energization of relay coil 18 adjacent thereto. If the motor energizing circuit were maintained, then the rotation of condenser 2 would be at a regular rate, and the frequency of the oscillator would be regularly varied between an upper and a lower limit. The associated circuit shown will control the energization of control coil 18 to release its armature 14 and to break the motor energizing circuit at random times in order to destroy the regular pattern and provide a random rate for the tuning condenser 2. This control circuit will not be described.

A toothed metal wheel 20 is mounted on the motor shaft 22 and rotates therewith. A small permanent magnet 25 is mounted in magnetic series relation with a soft iron core 24 and both are mounted adjacent the toothed wheel having a small air gap clearance therewith. A pickup coil 26 is mounted on said core 24 in which voltage is induced as the flux in the core varies due to passage of the teeth of the wheel. The frequency of this voltage is directly proportional to the speed of the motor. One of the coil terminals is grounded. The other terminal of the coil 26 is connected to condenser 28, which is in turn serially connected with a resistor 30, the opposite terminal of which is grounded. A variable tap 32 on the resistor 30 is directly connected to the control grid 34 of the first triode section of an amplifier tube 36. The cathode 38 of this first section is connected through a resistor 40 to ground. The plate 42 of the first triode section is connected through line 44 to one terminal of a dropping resistor 46. Line 48 is connected to the opposite terminal of resistor 46, to an intermediate point between resistors 50 and 52, and to a condenser 54. The opposite terminal of condenser 54 is grounded. The opposite terminal of resistor 52 is connected to a high potential source of supply, as indicated by the arrow through line 56.

A tie line 58 extends between line 44 and one terminal of a coupling condenser 60, the opposite terminal of which is directly connected to control grid 62 of the second triode section of the amplifier tube 36. A resistor 64 extends between grid 62 and ground. Cathode 66 of the second triode section of the tube 36 is connected through resistor 68 to ground. The plate 70 of the second triode section is connected to resistor 50 for plate voltage supply and to a coupling condenser 72, the opposite terminal of the latter being connected through line 74 with the plate 76 of the first triode section of a second duo-triode tube 78. The first section of this second tube 78 is used as a detector, the grid 80 and cathode 82 being connected together, and the second section is used as a trigger section controlling the energization of the solenoid coil 18. A tie line 84 is connected to one terminal of a inductance 86 and a capacitor 88 which provide a tuned circuit and to conductor 74. The opposite terminals of both inductance 86 and capacitor 88 are connected to ground through condenser 90 and to a conductor 92. A resistor 94 is connected between conductor 92 and commonly to the grid and cathode 80 and 82 respectively of the first section of the tube 78. A capacitor 96 is connected in parallel with the resistor 94.

Line 92 extends to one terminal of a resistor 98, the opposite terminal of which is connected to line 100. A conductive line 102 extends from the common grid and cathode 80 and 82 to contact 16 of the motor operating switch, and adjustable tap 104 on a resistor 106 is directly connected to the line 102 to provide variable biasing potentials therefor. One terminal of the resistor 106 is grounded and the opposite terminal connected through dropping resistor 108 to a source of high potential. Line 100 extends between control grid 110 of the second or trigger triode section of the tube 78 and an intermediate point between two condensers 112 and 114. The opposite terminal of condenser 112 is grounded. The plate 116 of the trigger section of the tube 78 is connected through line 118 to one terminal of the solenoid coil 18, the opposite terminal being connected through a dropping resistor 120 to a source of high potential. The cathode 109 of the trigger section is grounded.

That portion of the circuit so far described provides an alternating voltage generated in the pickup coil which is amplified through the two stages of the tube 36 and detected by the first section of the tube 78, after passing through resonant circuit 86—88 tuned slightly above any frequency of the pickup coil. This resonant circuit acts as a shunt to ground for higher frequencies such as harmonics. This, therefore, provides a D.C. voltage whose value is directly proportional to the speed of the motor shaft, which voltage is applied as a bias to the control grid 110 of the trigger section of the control tube. The system is so designed that when the motor circuit is closed the motor, therefore, immediately speeds up, increasing the pickup coil frequency, which results in voltage amplitude increase on amplifier 36, and the D.C. bias applied to the grid 110 changes. This negative bias is balanced against a fixed positive bias applied to the detector portion by the setting of the potentiometer 104, 106, and when this variable negative bias overcomes the fixed bias, the grid 110 of the trigger tube is driven sufficiently negative to lower the current through coil 18 and release its armature 14, breaking the energizing circuit for the motor 4 at some defined top limit of frequency of the pickup coil or maximum r.p.m. of the motor. The armature moves to rear contact 16 which grounds grid and cathode 80—82 to keep spurious signals from applying any operative voltages to control grid 110. The motor then begins to slow down and as the frequency and amplitude decreases, the D.C. negative bias provided by the output of the amplifier decreases to a predetermined point proportional to minimum r.p.m. of the motor where conduction through the trigger tube is increased to a value where coil 18 is able to attract its armature 14 to again complete the motor circuit by contacting stationary contact 10 and the motor again accelerates. This continual acceleration and deceleration of the motor provides a sweep through a predetermined band.

In order to properly adjust this portion of the circuit to provide the desired upper and lower frequency limits of the pickup coil or r.p.m. of the motor shaft, the following procedure may be followed. With the relay armature 14 away from contact 10 and the motor driven by any desired means at a desired low limit speed, the potentiometer 32, 30 controlling the amplitude of the input signal from the pickup coil is set to a position where the armature 14 just closes with contact 10. Then with the relay closed and the motor speed at a desired high speed limit, the potentiometer 104, 106 controlling the D.C. bias voltage on the detector cathode is adjusted to a position where the relay just opens. These two adjustments, therefore, set the upper and lower motor speed limits.

If, however, the control circuit so far described were used, the sweep between these two limits over the prescribed band would be relatively regular. In order to provide a random or unpredictable pattern for the variation in frequency of the wave generator, we provide a multi-vibrator unit of the free-running type, the output pulses of which are differentiated by condenser 114 and resistors 98, 94 and tap 104 on resistor 106 to ground, and applied to control grid 110 of the trigger section of the tube 78. The multi-vibrator consists of a single duo-triode tube 122; the control grid 124 of the first section is connected through a resistor 126 to ground and also through line 128 to a capacitor 130, the opposite side of which is connected to line 132. Line 132 extends to condenser 114 and to the plate 134 of the second triode section and through a dropping resistor 136 to line 138. Line 138 is connected through a further resistor 140 to a source of high potential indicated by the arrow. A condenser 142 is connected between line 138 and ground. A resistor 144 is connected between line 138 and plate 146 of the first triode section of the tube 122. A coupling condenser 148 is connected between plate 146 of the first triode section and control grid 150 of the second triode section. A resistor 152 is connected between control grid 150 and ground. Suitable low voltage is applied to the filament circuits of each of the tubes as indicated by the arrow.

The multi-vibrator, therefore, supplies a continuous series of pulses of a given frequency, which pulses are of alternate sign and are applied through line 100 to control grid 110. Thus if the potential of the grid 110, due to the D.C. voltage output of the pickup, is increasing toward a point of conduction and energization of the relay coil 18, and a positive pulse is applied through line 100 to grid 110, the relay will be actuated sooner than normally. On the other hand a negative pulse would not be effective since the tube is not conducting at any rate. Similarly, if the tube is conducting and the relay coil energized, and a positive pulse is applied, it would have no effect, whereas a negative pulse would cause the tube to cut off and the relay coil to be deenergized. Since the frequency of the multi-vibrator is different from the frequencies of the control circuit, the combination will provide a random indeterminable pattern for frequency variation of the tuner capacity of the oscillator for the jammer.

We claim:

1. In an electronic control circuit, movable tuning means, driving means for the tuning means, control wave generating means connected to the driving means, rectifying means connected to the control wave generating means in which a D.C. voltage is developed proportional to the speed of the driving means, a grid controlled electronic tube, conductive means connecting said grid to said rectifying means, adjustable biasing means connected to said rectifying means in opposed voltage relation to the developed D.C. voltage, the resultant voltage of the two biasing said tube, and electromagnetic relay switching means connected in the output circuit of the tube and to the driving means whose position is controlled by current flow through the tube controlling the energization of the driving means.

2. In an electronic control circuit, movable tuning means, driving means for the tuning means, control wave generating means connected to the driving means, rectifying means connected to the control wave generating means in which a D.C. voltage is developed proportional to the speed of the driving means, a grid controlled electronic tube, conductive means connecting said grid to said rectifying means, adjustable biasing means connected to said rectifying means in opposed relation to the developed D.C. voltage, the resultant voltage of the two biasing said tube, relay switching means connected in the output circuit of the tube and controlling the driving means, a pulse generating means of a different frequency connected to said grid and combining with the resultant voltage from the rectifying means to control the conductance of the tube.

3. In a wave generating means, a variable tuning means, a motor for continuously driving said tuning means, control wave generating means driven by said motor, a source of fixed frequency pulses, a relay for controlling the energization of the motor, an electronic amplifying means connected to the relay to control the energization of said relay, said amplifying means being connected to the output of both the control wave generating means driven by the motor and the fixed pulse source so that its conductivity is controlled by the resultant output of both.

4. In a wave generating means, a variable tuning means, means for driving said tuning means, a control wave generator driven by said driving means to produce waves whose frequency is proportional to the speed of the driving means, amplifying means connected to the control wave generating means, rectifying means connected to the output of the amplifying means producing a D.C. voltage that is proportional to the speed of the driving means, voltage biasing means of opposed sign connected to the rectifying means in opposition to the D.C. developed voltage, an electronic control tube having a grid and plate, conductive means connecting the output of the rectifier to the grid, and electromagnetic relay means connected in the output of the control tube and to the driving means to control the energization of the driving means dependent upon the voltage proportional to the speed of the driving means.

5. In a wave generating means, a variable tuning means, means for driving said tuning means, a control wave generator driven by said driving means to produce waves whose frequency is proportional to the speed of the driving means, amplifying means connected to the control wave generating means, rectifying means connected to the output of the amplifying means producing a D.C. voltage that is proportional to the speed of the driving means, biasing means of opposed sign connected to the rectifying means in opposition to the D.C. developed voltage, an electronic control tube having a grid and plate, conductive means connecting the output of the rectifier to the grid, relay means connected in the plate output of the control tube to control the driving means, and a source of fixed frequency pulses connected to said grid to, in combination with the output of the rectifier, determine the bias on the grid and the flow of current through the tube to control the driving means.

6. In a wave generator having a frequency determining element adjustable for tuning over a predetermined range of frequencies, a motor coupled to drive said frequency determining element, means for energizing said motor, signal generating means driven by said motor for generating a control signal proportional in amplitude to the speed of the motor, an oppositely biased control circuit connected to receive said control signal and having electro-mechanical switching means therein connected to the motor for controlling the energization of the motor to cause deenergization of said motor when the value of the control signal overcomes the opposite bias and is above a certain voltage level and re-energization when the control signal falls below a given voltage.

7. In a wave generator having a frequency determining element adjustable for tuning over a predetermined range of frequencies, a motor coupled to drive said frequency determining element, means for energizing said motor, signal generating means driven by said motor for generating a control signal proportional in amplitude to the speed of the motor, a biased control circuit connected to receive said control signal and having switching means therein for controlling the energization of the motor to cause deenergization of said motor when the value of the control signal is above a certain voltage level, and oscillatory generating means connected to said control circuit whose output merges with said control signal, the combined resultant signal controlling the switching means.

8. In a wave generator having an adjustable frequency determining element for tuning over a predetermined range of frequencies, driving means coupled to said element, means for energizing said driving means, voltage generating means driven by said driving means for generating a voltage whose amplitude changes in proportion to the speed of the driving means, an oppositely biased control circuit connected to the generating means and electrically actuated mechanically biased switching means connected to the control circuit and in turn connected to and controlling the operation of the driving means to cause deenergization thereof when the generated voltage overcomes the opposite bias and is above a certain level but again close the switching means when the voltage proportional to the speed of the driving means falls below a given level.

9. In a wave generating means, variable tuning means, driving means connected to said tuning means for varying the same, control means for the driving means including multi element electron tube means, and a plurality of means for generating variable voltages connected to at least one element of the tube for providing biasing voltages therefor, a portion of said means for generating variable voltages being operably associated with the driving means and varying as the speed of the driving means varies, and a further portion generating pulses of an independent frequency.

10. In an electronic wave generator, means for tuning a circuit over a desired band of frequencies, a motor connected to said means for driving said means, a control wave generator also connected to said motor and producing electrical waves whose frequency is proportional to the speed of the motor, rectifying means connected to the output of the control wave generator and developing a direct current voltage thereacross which is proportional to the speed of the motor, a fixed bias connected to the rectifying means of opposite polarity to that of the voltage developed by the control wave generator, a multivibrator section for producing a fixed frequency output signal, an electron tube having at least an output circuit and a control grid, a source of electrical power, a control relay connected in series with the output circuit and the source of electrical power and to the motor for controlling the motor, and means connecting the combined output of the rectifier and the multivibrator section to the control grid of the tube so that the algebraic sum of the signals from the multivibrator section and the rectifier will control the flow of current through the tube and therefore the energization of the control relay and motor.

References Cited in the file of this patent

UNITED STATES PATENTS

| | | |
|---|---|---|
| 1,762,999 | Manderfeld | June 10, 1930 |
| 1,934,400 | Bollman | Nov. 7, 1933 |
| 2,209,273 | Hill | July 23, 1940 |
| 2,254,899 | Laubenheimer | Sept. 2, 1941 |
| 2,395,575 | Mitchell | Feb. 26, 1946 |
| 2,427,175 | Young | Sept. 9, 1947 |
| 2,457,140 | Frankel | Dec. 28, 1948 |